(12) United States Patent
Toumura

(10) Patent No.: US 7,567,561 B2
(45) Date of Patent: Jul. 28, 2009

(54) PACKET COMMUNICATION NODE APPARATUS WITH EXTENSION MODULES

(75) Inventor: Kunihiko Toumura, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 941 days.

(21) Appl. No.: 10/929,795

(22) Filed: Aug. 31, 2004

(65) Prior Publication Data

US 2005/0232262 A1 Oct. 20, 2005

(30) Foreign Application Priority Data

Dec. 4, 2003 (JP) ............................. 2003-405504

(51) Int. Cl.
*H04L 12/28* (2006.01)

(52) U.S. Cl. .................................... 370/389

(58) Field of Classification Search ................ 370/389, 370/352, 353, 354, 355, 359, 419, 421, 423, 370/427, 390, 391, 392, 360, 323, 396, 398, 370/400, 403, 471, 902, 395.1, 395.52; 710/305, 710/20, 33; 709/213, 216
See application file for complete search history.

(56) References Cited

U.S. PATENT DOCUMENTS

| | | | | |
|---|---|---|---|---|
| 5,251,206 | A * | 10/1993 | Calvignac et al. | 370/352 |
| 6,795,431 | B2 * | 9/2004 | Endo | 370/352 |
| 6,973,093 | B1 * | 12/2005 | Briddell et al. | 370/421 |
| 7,024,450 | B1 * | 4/2006 | Deo et al. | 709/203 |
| 2002/0150088 | A1 | 10/2002 | Yoshino et al. | |
| 2004/0071142 | A1 | 4/2004 | Moriwaki et al. | |

FOREIGN PATENT DOCUMENTS

| | | |
|---|---|---|
| JP | 5-219100 | 9/1992 |
| JP | 10-93577 | 9/1996 |

OTHER PUBLICATIONS

Wakayama, Koji, et al., "Highly Reliable Modular Node Architecture with Performance Scalability and Functional Flexibility", Proceedings of the 2003 IEICE Communications Society Conference, Sep. 23-26, 2003, in Japanese with English translation.
Toumura, Kunihiko, et al., "Study of Modular IP Node Architecture", Technical Report of IEICE, vol. 103, No. 442, Nov. 20, 2003, pp. 59-62 & 7/E, in Chinese with English translation.

* cited by examiner

*Primary Examiner*—Chi H Pham
*Assistant Examiner*—Alexander Boakye
(74) *Attorney, Agent, or Firm*—Reed Smith LLP; Stanley P. Fisher, Esq.; Juan Carlos A. Marquez, Esq.

(57) ABSTRACT

A packet communication node apparatus comprises a plurality of interface modules 10, a plurality of service modules 30 for executing predetermined communication service processing in response to received packets, a packet transfer module 20 for transferring each received packet to one of the service modules or one of the interface modules, a packet switching unit 40 for mutually connecting the plurality of modules, wherein each of the interface modules is provided with routing means for selectively transferring a packet received from the network to one of the packet transfer module, the service modules and the other interface modules.

8 Claims, 13 Drawing Sheets

IP PACKET 50

HTTP MESSAGE 70

DNS MESSAGE 80

INTERNAL PACKET 60

SERVICE MODULE 30-j

EXTENSION MODULE SEARCH TABLE 16

| DESTINATION ADDRESS ~161 | PROTOCOL NUMBER ~162 | DESTINATION PORT NUMBER ~163 | EXTENSION MODULE ~164 | DEFINITENESS FLAG ~165 | |
|---|---|---|---|---|---|
| 192.168.0.1 | 6 | 80 | P3-0 | 0 | ~160-1 |
| 192.168.0.2 | 17 | 53 | P3-0 | 0 | ~160-2 |
| 192.168.0.3 | 6 | 25 | P3-5 | 0 | ~160-3 |
| ⋮ | ⋮ | ⋮ | ⋮ | ⋮ | |

FIG. 10A

Web SERVICE MODULE SEARCH TABLE 26A

| HOST NAME 261 | FILE NAME 262 | EXTENSION MODULE 263 | |
|---|---|---|---|
| www.example.com | /index.html | P3-1 | 26A-1 |
| www.example2.com | /~example/example.gif | P3-2 | 26A-2 |
| ⋮ | ⋮ | ⋮ | |

FIG. 10B

DNS SERVICE MODULE SEARCH TABLE 26B

| CONTENTS OF INQUIRY 264 | EXTENSION MODULE 265 | |
|---|---|---|
| www.example.com | P3-3 | 26B-1 |
| www.example.net | P3-4 | 26B-2 |
| www2.example.com | P3-3 | 26B-3 |

FIG. 11

Web CACHE FILE 36W

| FILE NAME (361) | CONTENTS (362) | |
|---|---|---|
| /index.html | HTTP/1.1 200 OK ...<H1>Welcome<H1>... | 36W-1 |
| ⋮ | ⋮ | |

FIG. 12

DNS CACHE FILE 36D

| CONTENTS OF INQUIRY (363) | CLASS (364) | ADDRESS (365) | |
|---|---|---|---|
| www.example.com | A | 192.168.0.1 | 36D-1 |
| www.example.com | MX | 0 mail.example.com | 36D-2 |
| www2.example.com | A | 192.168.0.2 | 36D-3 |
| ⋮ | ⋮ | ⋮ | |

PACKET COMMUNICATION NODE APPARATUS WITH EXTENSION MODULES

CLAIM OF PRIORITY

The present application claims priority from Japanese application serial no. 2003-405504, filed on Dec. 4, 2003, the content of which is hereby incorporated by reference into this application.

BACKGROUND OF THE INVENTION

1. Field of the Invention

The present invention relates to a packet communication node apparatus, and more particularly to a packet communication node apparatus whose hardware functions are made extensible by the addition of a functional module or modules.

2. Description of the Related Art

The main function of communication node apparatuses, such as routers, constituting a packet communication network is to relay or transfer packets between network lines. If such a communication node apparatus can have one of the communication service functions which have so far been performed by a server or a data processing device connected to the communication network, it will provide an advantage that responses to user terminals are quickened and traffic on the network is reduced. In this case, it is preferable for any communication service function added to the communication node apparatus to be flexibly extensible to meet possible new needs of users and the market.

Known packet node apparatuses permitting extension of communication service functions include, for instance, what is proposed in the Japanese Unexamined Patent Application No. 2002-281072 (US 2002/0150088 A1: Patent Reference 1). It relates to an inter-network device comprising a plurality of routing modules connected to one another by a host bus and a line control module coupled to each routing module by a subordinate bus, and proposes to replace one of the line control modules accommodating network lines with a functional extension module, transfer IP packets whose header information satisfies conditions prescribed in a detection condition table in advance, out of the IP packets transferred from the line control modules to the routing modules, via the host bus to the routing module accommodating the functional extension module, and having that routing module supply received packets to the functional extension module thereby to cause the functional extension module to process a service, such as encrypting the received packets, for instance.

The packet node apparatus described in the Patent Reference 1 has an advantage of scalable realizing functional extension of the node apparatus because a new service processing function can be added to the node apparatus by partly altering the functions of the routing modules and replacing part of the line control modules with the functional extension module.

However, since each routing module which has to perform high speed processing of received packets has no capability for payload analysis of received packets, the detection condition table is obliged to select the received packets to be transferred to the functional extension module merely on the basis of header information extractable from the packet header, such as the destination IP address, the source IP address and the TCP port number. Therefore, it is difficult for a system which controls packet transfers to a functional extension module by a routing module coupled to a line control module as proposed in Patent Reference 1 to accomplish highly precise allocation of packets, which presupposes analysis of payloads, and is accordingly limited in the variety of functional extension modules connectable to a node apparatus.

SUMMARY OF THE INVENTION

An object of the present invention is to provide a packet communication node apparatus enriched in the variety of communication service processing (the variety of applications) realizable by the addition of a functional extension module.

Another object of the invention is to provide a packet communication node apparatus enabled to accomplish high-speed execution of communication service processing through load distribution to a plurality of functional extension modules.

Still another object of the invention is to provide a packet communication node apparatus capable of high precision allocation of received packets to appropriate functional extension modules or service modules according to the results of payload analysis of received packets.

In order to achieve the objects stated above, a packet communication node apparatus according to the invention comprises a plurality of interface modules each connected to network input/output lines, a plurality of service modules (functional extension modules) each for executing predetermined communication service processing in response to a received packet, a packet transfer module for transferring a received packet to one of the service modules or one of the interface modules, and a switching unit for mutually connecting the plurality of modules to exchange packets among the modules, wherein each of the interface modules is provided with routing means for selectively transferring, via the switching unit, a packet received from a network input line to one module selected from among the packet transfer module, service modules, and one of the other interface modules corresponding to a destination address of the received packet.

One of the features of the invention resides in that each of the service modules (functional extension modules) is provided with routing means for checking a payload of a packet received from the switching unit, and selectively transferring the received packet to the packet transfer module or one of the interface modules corresponding to the destination address when the packet was judged impossible to be handled by its own module.

In one embodiment of the invention, the routing means of each of the service modules selectively transfers the received packet to one of the interface modules corresponding to the destination address when the received packet was judged impossible to be handled by its own module and it was judged that no other service module for executing an application similar to its own module is connected to the switching unit.

One of the features of the invention resides in that at least two of the plurality of service modules accommodated in the switching unit are provided with a communication service processing function for a similar application to each other, and the allocation of received packets to these service modules is accomplished via the packet transfer module.

In more detail, in the packet communication node apparatus according to the invention, each of the interface modules has an extension module search table comprising a plurality of table entries each defining a packet transfer destination module corresponding to a combination of specific header items of a received packet and a routing table comprising a plurality of table entries each defining a packet transfer destination module corresponding to destination address of a received packet, wherein the routing means of each of the interface modules identifies the packet transfer module or service module for which the received packet is destined on the basis of header information of the packet received from the network input line and the extension module search table and, when the header information of the received packet does not agree with none of the combinations of header items defined in the extension module search table, identifies the interface module for which the received packet is destined in accordance with the routing table.

Further in the packet communication node apparatus according to the invention, the packet transfer module has a service module search table comprising a plurality of table entries each defining a packet transfer destination module corresponding to a combination of a specific header item and payload information of a received packet and a routing table comprising a plurality of table entries each defining a packet transfer destination module corresponding to the destination address of a received packet, wherein the packet transfer destination service module of the received packet is identified on the basis of the service module search table and, if the header item and payload information of the received packet do not agree with none of the definition in the service module search table, an interface module corresponding to the destination address of the received packet is identified in accordance with the routing table.

According to the invention, each of received packets, whose transfer destination service module should be identified by payload analysis of the packet, can be allocated with high precision to an appropriate service module by transferring the received packet from interface modules to packet transfer module, and subjecting it to payload analysis by the packet transfer modules.

Also, the presence of the packet transfer modules enables the packet communication node apparatus according to the invention to be enriched in the variety of communication service processing realizable by the functional extension module, and since it can accommodate a plurality of service modules provided with mutually similar applications, the capability of communication service processing can be enhanced through the distribution of loads among the plurality of functional extension modules.

Further, according to the invention, received packets whose transfer destination service modules can be identified by the pertinent interface modules are directly transferred from the interface modules to the service modules, and any received packet whose transfer destination service module cannot be identified by the interface module is allocated to the transfer destination service module via the packet transfer module. This makes possible communication service processing reduced in loads on and packet transfer delays in the packet transfer modules.

BRIEF DESCRIPTION OF THE DRAWINGS

FIG. 10A shows an example of contents of a Web service module search table 26A provided in the packet transfer module 20.

FIG. 10B shows an example of contents of a DNS service module search table 26B provided in the packet transfer module 20.

FIG. 11 shows an example of contents of a Web cache file 36W provided in a Web service module.

FIG. 12 shows an example of contents of a DNS cache file 36D provided in a DNS service module.

DESCRIPTION OF THE PREFERRED EMBODIMENTS

A preferred embodiment of the present invention will be described by referring to the accompanying drawings.

Figure 1:
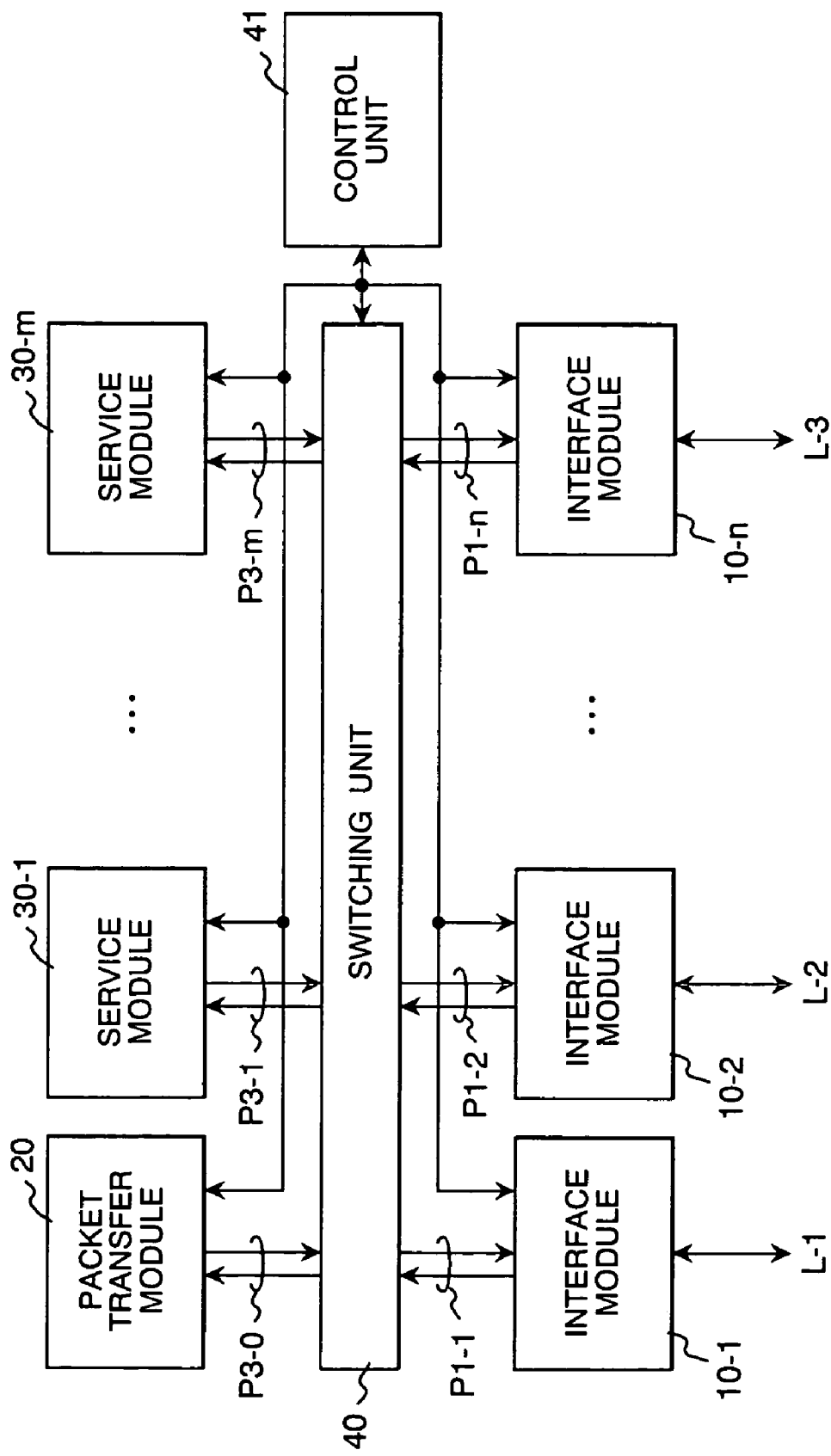
FIG. 1 shows the configuration of a packet communication node apparatus according to the present invention.

FIG. 1 shows the overall configuration of a packet communication node apparatus according to the invention. The packet communication node apparatus shown here comprising a plurality of interface modules 10(10-1 through 10-$n$), a packet transfer module 20, a plurality of service modules 30 (30-1 through 30-$m$), a switching unit 40 for exchanging packets between these modules and a control unit 41, is provided with functions as a router.

The interface module 10-$i$ ($i$=1 to n), connected between a network line L-i and a switch port having port numbers P1-$i$, converts a packet received from the network line L-i into a packet having an internal header (hereinafter referred to as an internal packet), transfers the converted packet to one of the other modules connected to the switching unit 40, converts a packet (internal packet) received from another module via the switching unit 40 into an ordinary transmission packet and delivers it to the network line L-i.

The packet transfer module 20 is connected to a switch port having port number P3-0 and, when an internal packet is received via the switching unit 40 from one of the interface modules 10, analyzes the contents of the payload portion (data portion) of the received packet. Then it transfers the packet to one of the service modules 30-$j$ ($j$=1 to m) or to one of the interface modules 10-$i$ ($i$=1 to n).

The service modules 30-$j$ ($j$=1 to m) have communication service functions, such as a Web server, a DNS server, an electronic mail server and a security server for instance. Upon receiving an internal packet. through a switch port having a port number P3-$j$ from the switching unit 40, the service modules perform predetermined services, respectively.

The control unit 41 controls the timings of transfers of the internal packet by the plurality of modules 10, 20 and 30. The switching unit 40, comprising a switch fabric for exchanging packets among a plurality of physical ports or a bus type switch for exchanging packets among a plurality of logical ports, achieves packet exchanges among the modules according to a module identifier (the switch port number in this embodiment) assigned to the internal packet.

In the following description, the packet communication node apparatus is supposed to be provided with a Web service module, a DNS service module and an electronic mail service module, each responding to a received packet by utilizing information stored in a cache file, as the service modules 30-$j$ (j=1 to m).

Figure 2:
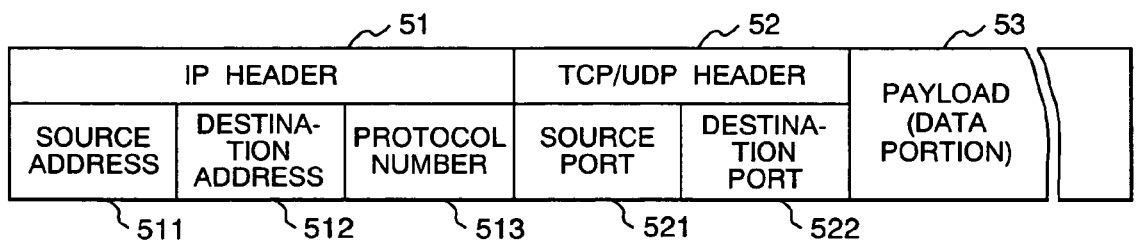
FIG. 2 shows one example of format of a received packet from a network.

FIG. 2 shows a format of an IP packet 50 transmitted or received by the interface module 10-$i$ over the network line L-$i$. The IP packet 50 comprises an IP header 51, a TCP/UDP header 52 and a payload (data portion) 53, and the IP header 51 further includes a source address 511, a destination address 512 and a protocol number 513. The TCP/UDP header 52 further includes a source port number 521 and a destination port number 522, which identify the type of the application to be used.

Figure 3:
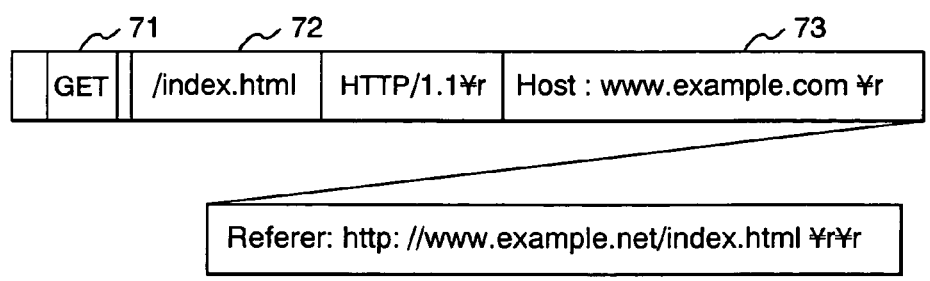
FIG. 3 shows a format of an HTTP message included in the payload of a received packet.
Figure 4:
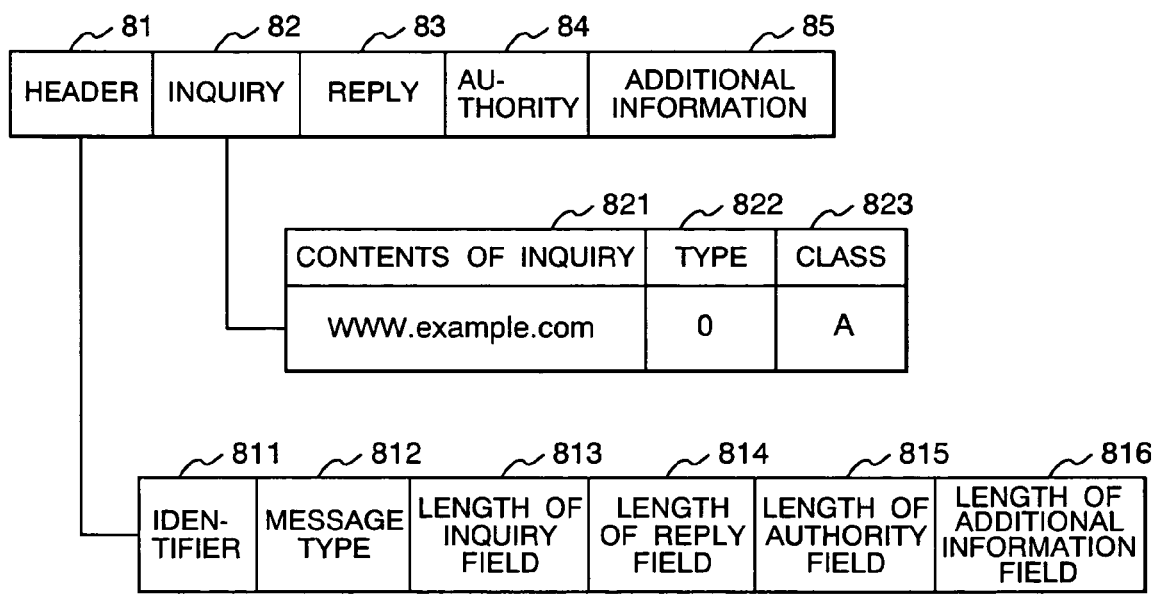
FIG. 4 shows a format of a DNS message included in the payload of a received packet from the network.

To facilitate the understanding of the operation of the packet communication node apparatus according to the invention, as an example of IP packet payload 53, the format of an HTTP contents acquisition request message 70 is shown in FIG. 3, and the format of a DNS message 80 for use in an address inquiry is shown in FIG. 4.

The HTTP contents acquisition request message 70, as shown in FIG. 3, includes a character string "GET" indicating contents acquisition as a request type 71, and designates a file name 72 and a host name 73 following the request type 71.

On the other hand, as shown in FIG. 4, a DNS message 80 is comprised of a header field 81, an inquiry field 82, a reply field 83, an authority field 84 and an additional information field 85. The header field 81 includes an identifier 811, a message type 812, length information 813 of inquiry field, length information 814 of reply field, length information 815 of authority field and length information 815 of additional information field. The inquiry field 82 includes contents of inquiry 821, a type 822 and a class 823. Since an IP address inquiry message does not need the reply field 83, the authority field 84 or the additional information field 85, "0" is set in the length information fields 814 through 816 of the header section. The inquiry field 82 has contents in which an object host name is designated as the contents of inquiry 821 and the values of the inquiry type and the inquiry class are designated in the type 822 and the class 823, respectively.

Figure 5:
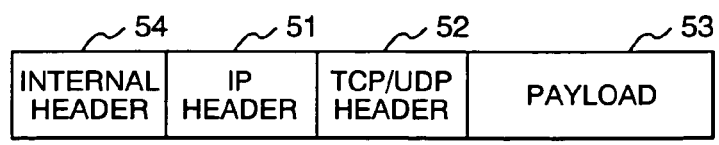
FIG. 5 shows a format of an internal packet transferred by a switching unit 40.

FIG. 5 shows the format of an internal packet 60 transferred by the switching unit 40. The internal packet 60 has an internal header 54 added to the top of the IP packet 50, and a switch port number and the value of a definiteness flag are set in the internal header 54 as will be described afterwards.

Figure 6:
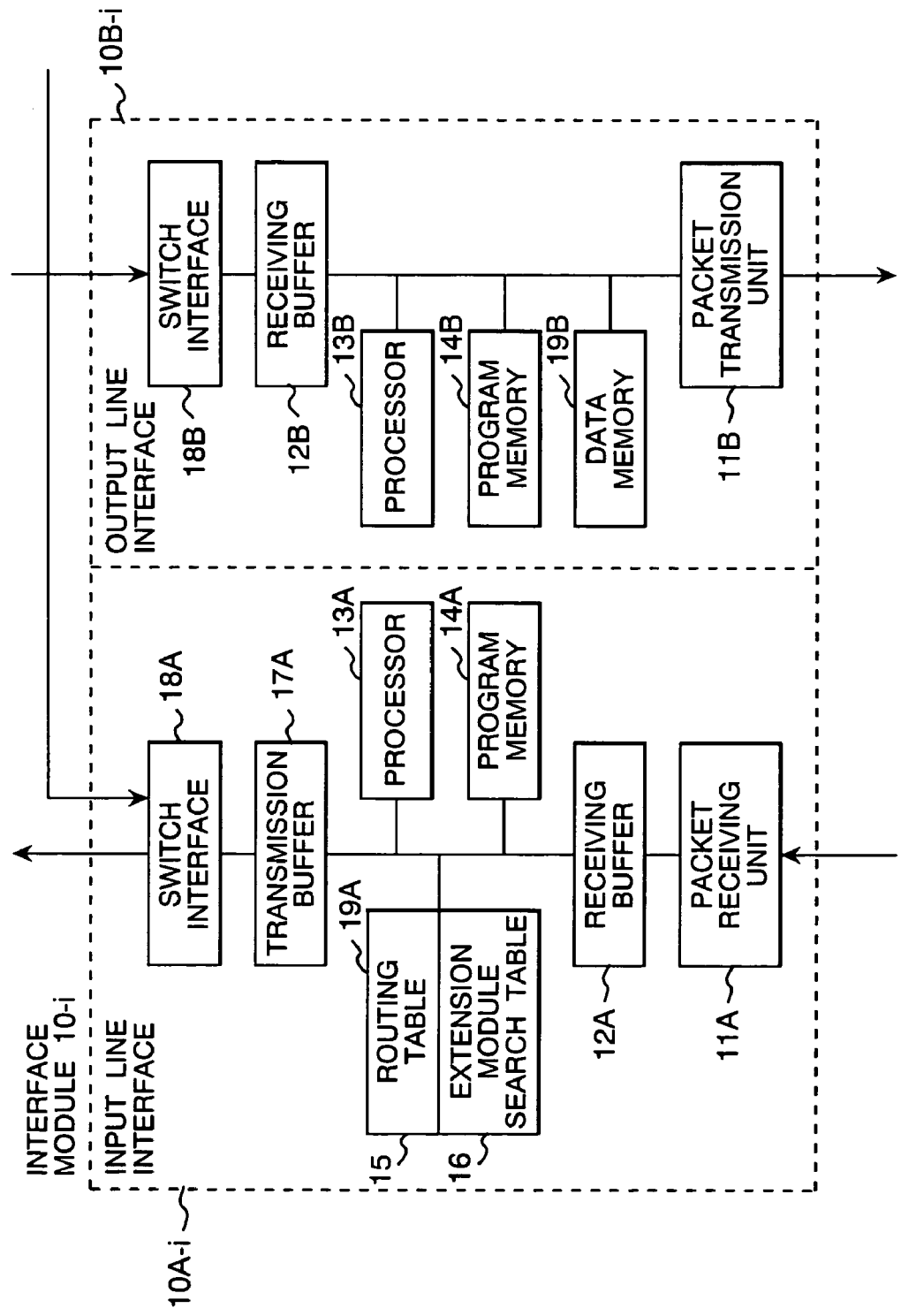
FIG. 6 is a block diagram showing one embodiment of an interface module 10-$i$.

FIG. 6 shows one example of the block configuration of the interface module 10-$i$. The interface module 10-$i$ shown here comprises of an input line interface 10A-i and an output line interface 10B-i.

The input line interface 10A-i includes a packet receiving unit 11A connected to an input line of the network, a receiving buffer 12A for temporarily storing received packets, a processor 13A, a program memory 14A, a transmission buffer 17A, a switch interface 18A and a data memory 19A, wherein the elements 12A through 17A and 19A are connected by an internal bus. In the data memory 19A, there are formed a routing table 15 and an extension module search table 16.

The processor 13A, as will be described afterwards, reads out received packets stored in the receiving buffer 12A in accordance with a received packet processing routine prepared in the program memory 14A, adds an internal header representing a transfer destination switch port number to each received packet, and supplies the packet to the transmission buffer 17A. The switch port number of the transfer destination for the received packet can be identified with referring to the extension module search table 16 or the routing table 15. The switch interface 18A reads out of the transmission buffer 17A internal packets in accordance with a control signal from the control unit 41, and transfers them to the switching unit 40.

The output line interface 10B-i is comprised of a switch interface 18B, a receiving buffer 12B for temporarily storing internal packets received from the switching unit 40, a processor 13B, a program memory 14B, a packet transmission unit 11B connected to the output line of the network and a data memory 19B, wherein the elements 11B through 12B and 19B are connected by an internal bus.

The switch interface 18B receives internal packets each having a switch port number P1-$i$ supplied from the switching unit 40, and temporarily stores them in the receiving buffer 12B. The processor 13B reads out an internal packet from the receiving buffer 12B in accordance with a transmission packet processing routine prepared in the program memory 14B, removes the internal header from it, and supplies the resultant packet as a transmission packet to the packet transmission unit 11B. The packet transmission unit 11B transmits the transmission packet to the output line of the network in a predetermined signal form.

Although the interface module 10-$i$ here is divided into the input line interface 10A-i and the output line interface 10B-i and received packets and transmission packets are processed by separate processors, received packets and transmission packets may as well be processed by a single processor on a time division basis.

Figure 7:
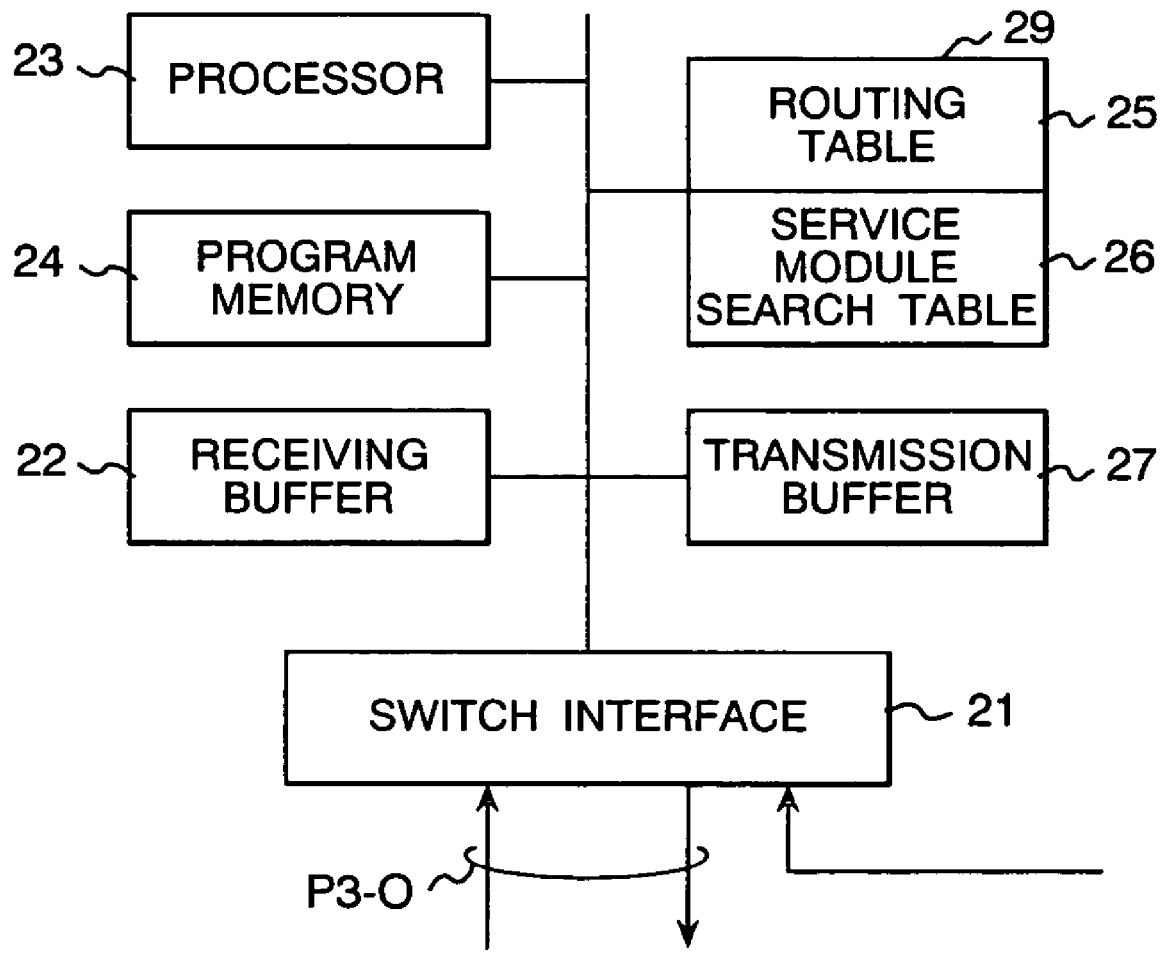
FIG. 7 is a block diagram showing one embodiment of a packet transfer module 20.

FIG. 7 shows an example of the block configuration of the packet transfer module 20.

The packet transfer module 20 is configured of a switch interface 21 connected to the switching unit 40, a receiving buffer 22 for temporarily storing internal packets received from the switching unit 40, a processor 23, a program memory 24, a transmission buffer 27 and a data memory 29. In the data memory 29, there are formed a routing table 25 and a service module search table 26. The switch interface 21 receives from the switching unit 40 internal packets each having a switch port number P3-0, stores them in the receiving buffer 22, reads out of the transmission buffer 27 internal packets in accordance with a control signal from the control unit 41, and transfers them to the switching unit 40. Details of the packet transfer processing routine executed by the processor 23 and of the service module search table 26 will be described afterwards.

Figures 8, 9:
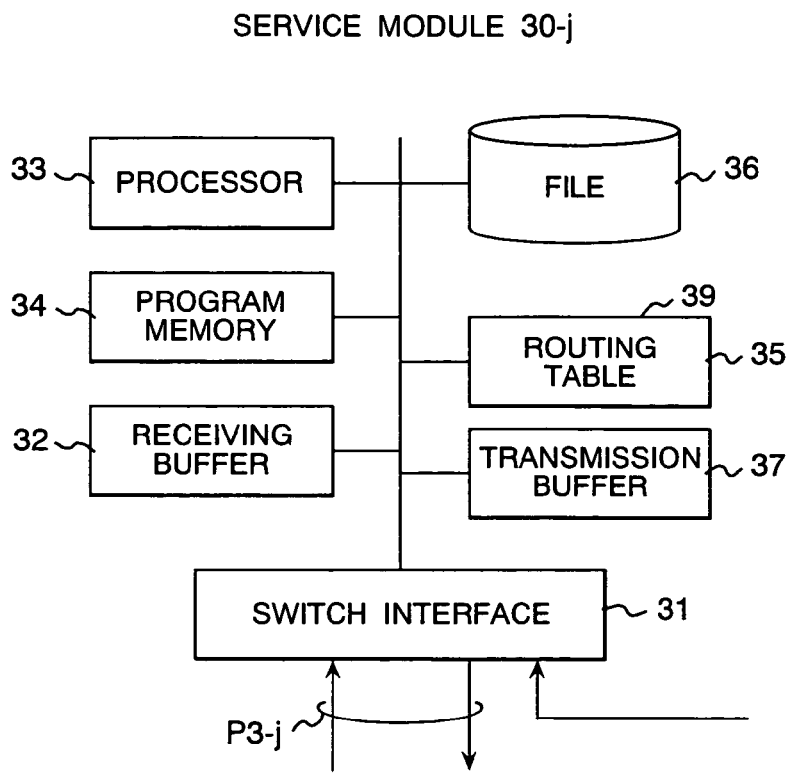
FIG. 8 is a block diagram showing one embodiment of a service module 30-$j$.
FIG. 9 shows an example of contents of an extension module search table provided in the interface module 10-$i$.

FIG. 8 shows an example of the block configuration of the service modules 30-$j$.

Each of the service modules 30-$j$ comprises a switch interface 31 connected to the switching unit 40, a receiving buffer 32 for temporarily storing internal packets received from the switching unit 40, a processor 33, a program memory 34, a file 36, a transmission buffer 37 and a data memory 39 in which a routing table 35 is formed. The switch interface 31 receives from the switching unit 40 internal packets each having a switch port number P3-$j$, stores them in the receiving buffer 32, reads out of the transmission buffer 37 internal packets in accordance with a control signal from the control unit 41, and transfers them to the switching unit 40.

Information matching the function of the service module 30-$j$ is stored in the file 36. In the case where the service module 30-$j$ is a Web service module or a DNS service module, the file 36 is used as a cache file for storing cache information acquired from the Web server or the DNS server connected to the network. In the case where the service module 30-*j* is an electronic mail service module, the file 36 is used for storing electronic mail information in association with the user's e-mail address. The service processing routine executed by the processor 33 and the contents of the file 36 will be described afterwards.

FIG. 9 shows an example of contents of the extension module search table 16 provided in the interface module 10-*i*.

In the extension module search table 16, there are registered a plurality of entries 160 (160-1, 160-2, . . . ) each representing the relation between attribute information for identifying the received packet to be transferred to the packet transfer module 20 or one of the service modules 30-1 through 30-*m*, and the switch port number of the extension module to be the destination of the packet transfer. The extension module mentioned above is one of the packet transfer module 20 and the service modules 30-1 through 30-*m* connected to the switching unit 40.

In this embodiment, each of the entries 160 in the extension module search table designates a destination address 161, a protocol number 162 and a destination port number 163 as items of the attribute information to be required to have for the packet which is the object of service, and identifies, in correspondence with these items of packet attribute information, the switch port number 164 of the packet transfer destination module to be set in the internal header and the value of a definiteness flag 165. The definiteness flag 165 takes on "1" when the service module, which is the destination of packet transfer, can be uniquely determined according to the packet attribute information. As is well known, among the destination port numbers, for instance, "80" corresponds to the HTTP Web server, "53", the DNS server and "25", the electronic mail server.

The processor 13A of each interface module extracts the values of the destination address 512, the protocol number 513 and the destination port numbers 522 from the IP header 51 and the TCP/UDP header 52 of the packet received from the network, and searches the extension module search table for a table entry matching the combination of these extracted values. If a hit entry is found, the received packet will be transferred to the extension module having the switch port number 164 designated by the entry. If no hit entry is found, the received packet will be transferred to one of the other interface module in accordance with the routing table 15. In the example shown here, the received packet whose attribute information corresponds to the entry 160-1 or the entry 160-2 is transferred to the packet transfer module 20 having the switch port number P3-0, and the received packet whose attribute information corresponds to the entry 160-3 is transferred to the electronic mail service module having the switch port number P3-5.

In this embodiment, the packet transfer module 20 is provided with a plurality of types of search tables according to the application types of the service modules as the service modules search table 26. As examples of service module search table 26, a search table 26A for Web service modules is shown in FIG. 10A, and a search table 26B for the DNS service is shown in FIG. 10B.

Entries 26A-1, 26A-2, . . . in the web service module search table 26A designates the switch port number 263 of the extension module as the transfer destination of the packet, in correspondence with the combination of a host name 261 and a file name 262. On the other hand, the entries 26B-1, 26B-2, . . . of the search table 26B for the DNS service designate the switch port number 265 of the extension module as the transfer destination of the packet, in correspondence with the contents of inquiry 264 of the IP address inquiry message of DNS.

The processor 23 of the packet transfer module 20 selects the applicable service module search table in accordance with the destination port number 522 indicated by the PCT/UDP header of the packet received from the switching unit 40. The processor 23 extracts search key information adapted to the service module search table from the payload of the received packet, and executes table search. If an entry matching the search key is found, the process or 23 will transfer the received packet to the service module (switch port number) designated in the entry as the extension module to which the packet is to be transferred. If no hit entry is found with the search key information, the processor 23 will transfer the received packet to one of the interface modules corresponding to the destination address 512 in accordance with the routing table 25.

FIG. 11 shows an example of Web cache file 36W provided in the Web service modules. In the Web cache file 36W, a plurality of records 36W-1, . . . each including a file name 361 and Web contents 362 are stored. In the case where the packet communication node apparatus is provided with a plurality of Web service modules, the configuration of the Web cache file may differ from one Web service module to another.

FIG. 12 shows an example of DNS cache file 36D provided in a DNS service module, for instance, a service module 30-3 connected to a switch port number P3-3. In the DNS cache file 36D, a plurality of records 36D-1, 36D-2, . . . indicating an address 365 to be replied to the request source are stored, in association with to contents of inquiry 363 and a class 364 designated in the inquiry field of the DNS message.

The operation of the packet communication node apparatus shown in FIG. 1 will be described in detail below by referring to FIG. 13 through FIG. 17.

Figure 13:
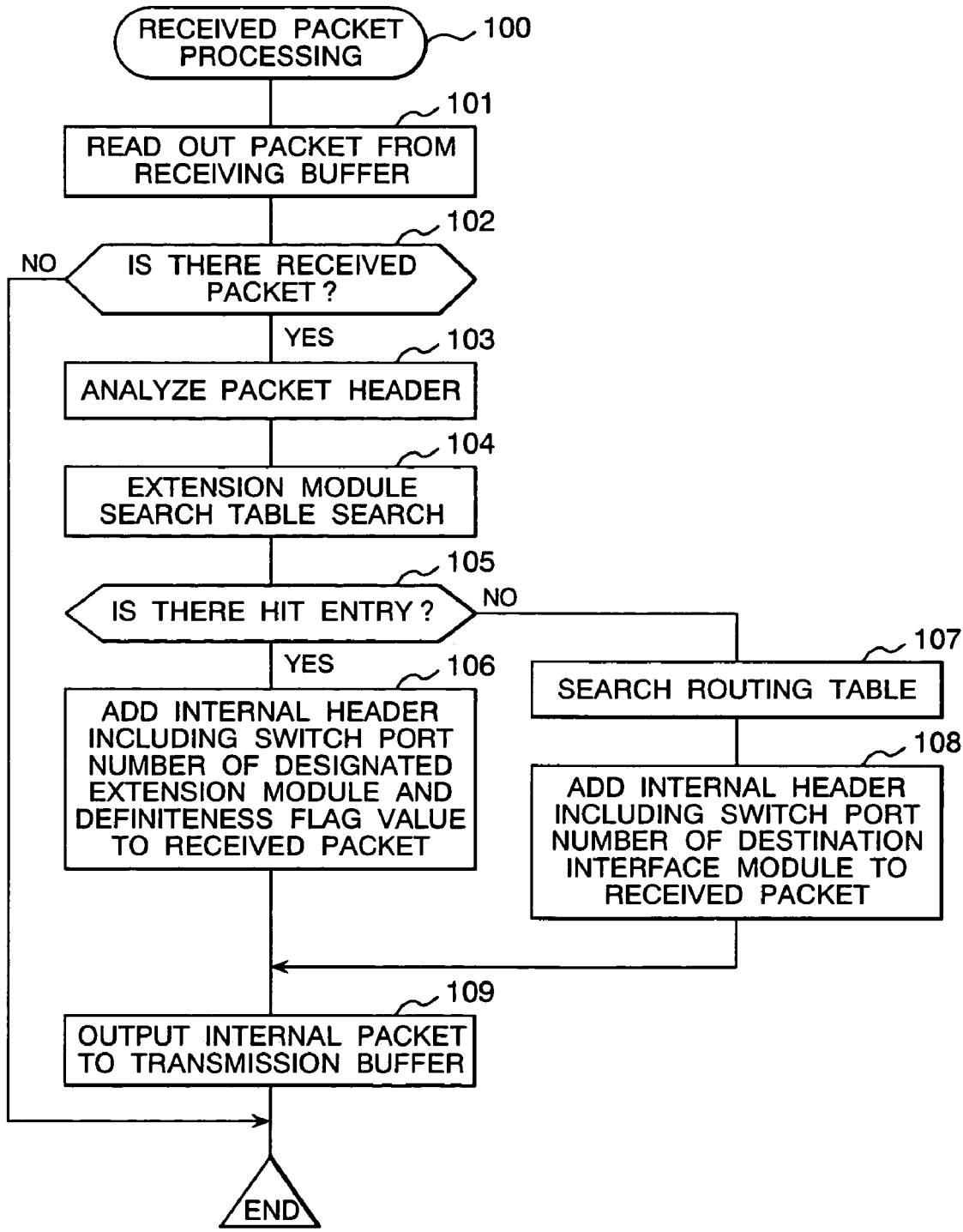
FIG. 13 is a flow chart showing an example of received packet processing routine 100 to be executed by the interface module 10-$i$.

FIG. 13 is a flow chart of a received packet processing routine 100 to be executed by the processor 13A of the interface module 10-*i* (i=1 to n).

In the received packet processing routine 100, one of received packets is read out of the receiving buffer 12A (step 101) and, if there is no received packet in the receiving buffer 12A (102), this routine is ended. When any received packet is read out, the packet header is analyzed to extract the destination address, the protocol number and the destination port number (103) and the extension module search table 16 is searched with this extracted information as the search key (104). As a result of the table search (105), if an entry matching the search key is found, an internal header including the switch port number 164 of the extension module designated by the entry as the destination of packet transfer and the value the definiteness flag 165 is added to the received packet (106), and the resultant packet is supplied as an internal packet to the transmission buffer 17A (109).

When no entry corresponding to the search key is found in the extension module search table 16, the routing table 15 is searched according to the destination address of the received packet (107) After that, an internal header including the switch port number of the interface module designated as the destination of transfer in the routing table 15 is generated and added to the received packet (108), and the resultant packet is supplied as an internal packet to the transmission buffer (109).

It can be understood that, in the packet communication node apparatus according to the invention, each interface module 10 selectively transfers, according to the received packet processing routine 100, a received packet having attribute information registered in advance as an entry in the extension module search table 16 to either the packet transfer module 20 or one of the service modules 30, and selectively transfers any other received packet to one of the other interface modules represented in the routing table 15.

In the case where the processor 13A is dedicated for use by the input line interface 10A-i, the program sequence can return to step 101 to process the next received packet after supplying the internal packet to the transmission buffer 17A (109). In the case where the processor 13A is used in common by the input line interface 10A-i and the output line interface 10B-i, the received packet processing routine 100 and a transmission packet processing routine (not shown) by which the internal header is removed from an internal packet read out of the receiving buffer 12B and supplied as a transmission packet to the packet transmission unit 11B can be executed alternately.

Figure 14:
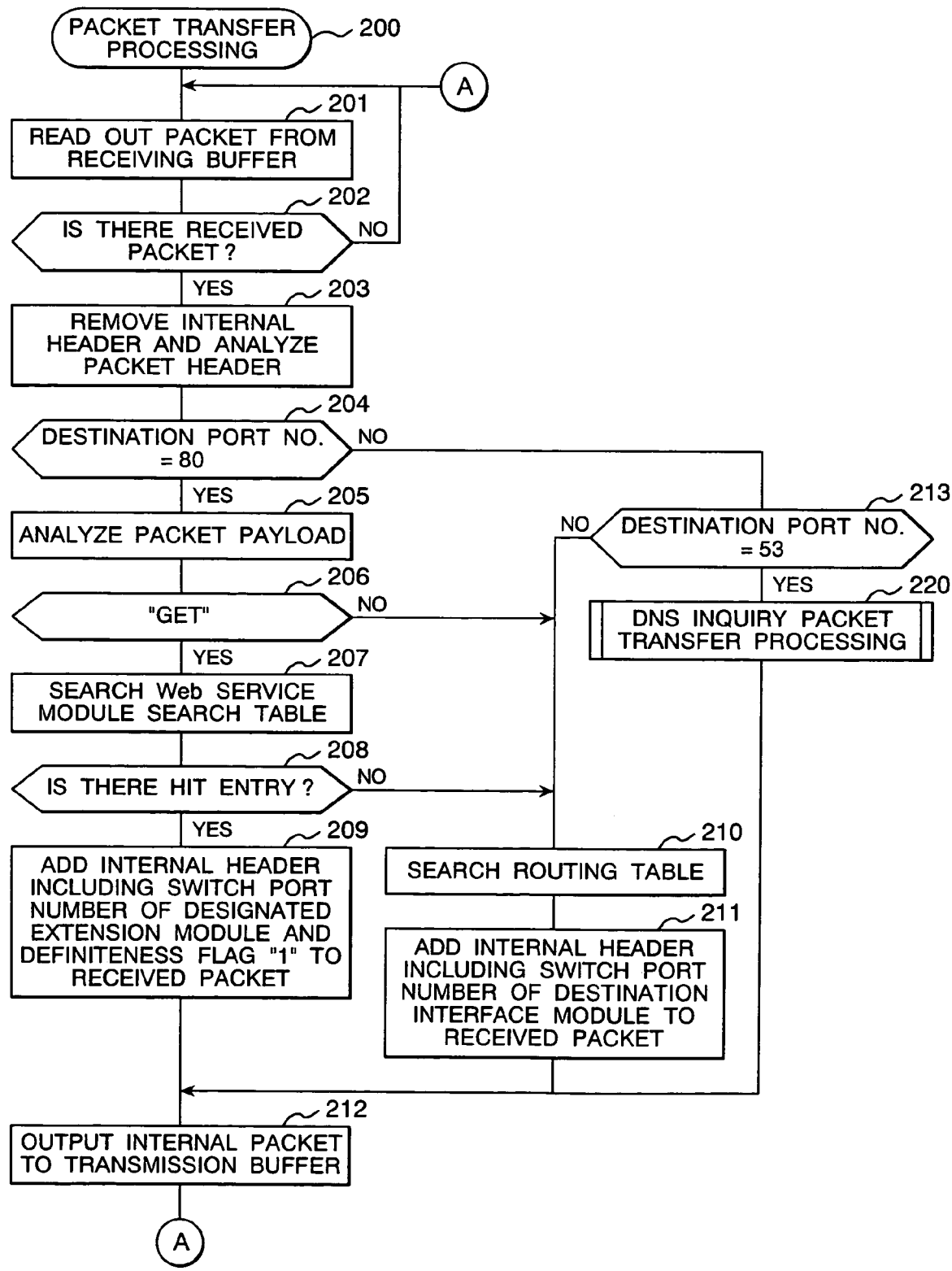
FIG. 14 shows an example of a packet transfer processing routine 200 to be executed by the packet transfer module 20.

FIG. 14 is a flow chart of a packet transfer processing routine 200 to be executed by the processor 23 of the packet transfer module 20.

In the packet transfer processing routine 200, one of packets is read out of the receiving buffer 22 (step 201) and, if there is no packet in the receiving buffer (202), the program sequence returns to step 201 and the same operation are repeated until a packet is received. Once a packet is read out, the internal header is removed from the packet, and the packet header is analyzed to extract a destination port number (203). The destination port number is checked (204) and, if the value of the destination port number is "80" representing an application for the HTTP Web server, the payload of packet is analyzed (205) to determine whether the request type 71 of the HTTP message is "GET" indicating a request for contents (206).

When the request type is "GET", the Web service module search table 26A is searched with the host name 73 and the file name 72 indicated by the HTTP message as the search keys (207). As a result of the table search (208), if an entry matching the search keys is found, an internal header including the switch port number 263 of the extension module designated in the matched entry as the destination of packet transfer and a definiteness flag="1" is generated to add to the packet (209), and the resultant packet is supplied as an internal packet to the transmission buffer 17A (212).

When the request type is not "GET" or there is no entry matching the search keys in the Web service module search table 26A, the routing table 25 is searched according to the destination address of the packet (210) After that, an internal header including the switch port number of an interface module designated in the routing table 25 as the destination of packet transfer is generated to add to the packet (211). After the resultant packet is supplied to the transmission buffer (212), the program sequence returns to step 201.

Figure 15:
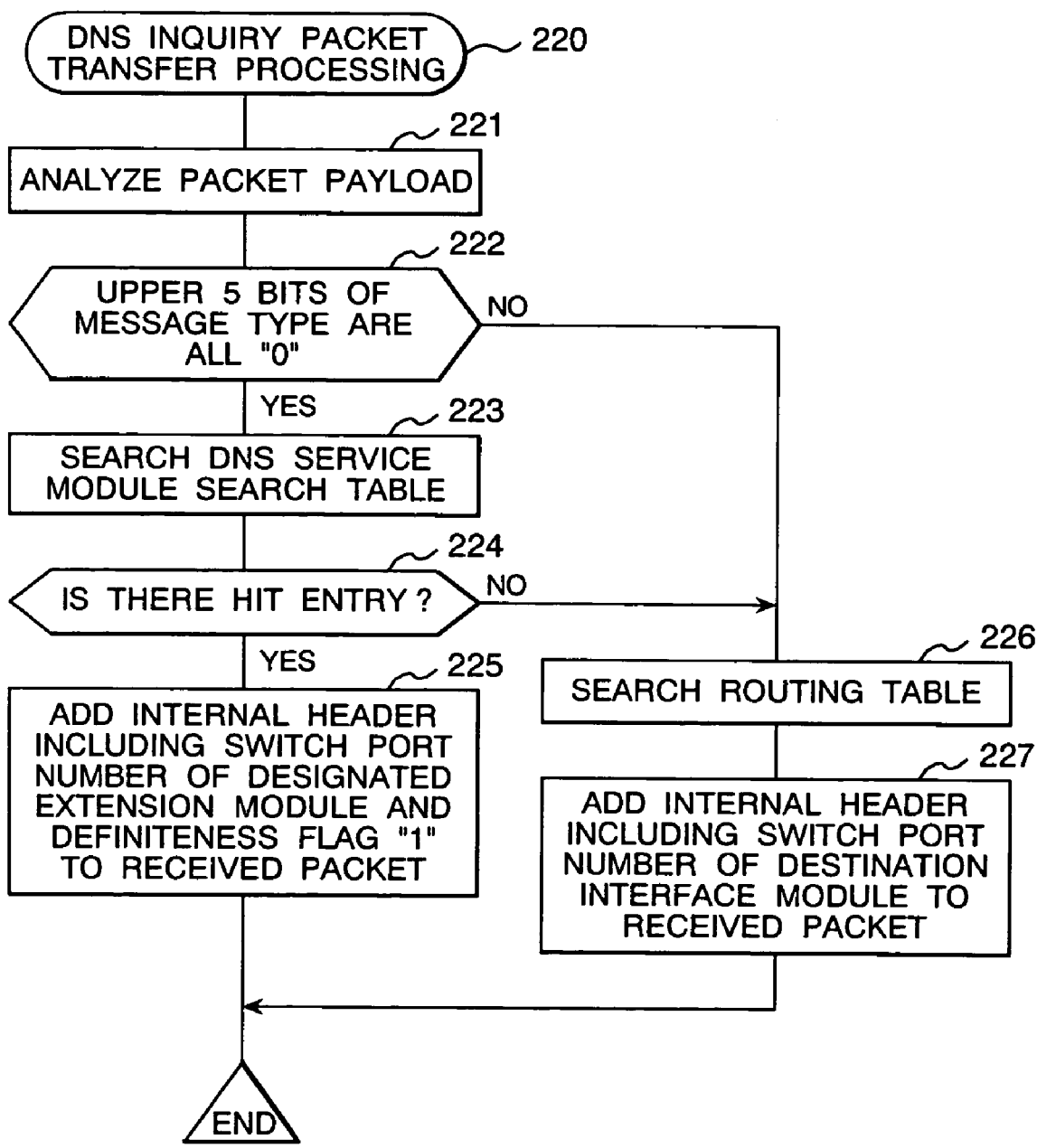
FIG. 15 shows an example of a DNS inquiry packet transfer processing routine 220 shown in FIG. 14.

When the destination port number is not "80" at step 204, it is judged whether the value of the destination port number is "53" representing an application for the DNS server (213). If the value of the destination port number is "53", a DNS inquiry packet transfer processing routine 220 charted in FIG. 15 is executed to supply an internal packet having a new internal header to the transmission buffer 17A (212). If the value of the destination port number is not "53", steps 210 through 212 described above are executed.

In the DNS inquiry packet transfer processing routine 220, as shown in FIG. 15, the payload of the packet is analyzed (221), and it is judged whether all the upper five bits of the message type 812 in the DNS message header are "0" (222). If all the upper five bits are "0", the contents of inquiry 821 is extracted from the inquiry field 82 of the DNS message, and the DNS service module search table 26B is searched with the contents as the search key (223). As a result of search (224), if an entry matching the search key is found, an internal header including the switch port number 265 of an extension module designated in this entry as the destination of packet transfer and a definiteness flag="1" is generated and added to the packet (225) to end this routine.

When no entry matching the search key is found in the DNS service module search table 26B or at least one of the upper five bits of the message type 812 is not "0" at step 222, the routing table 25 is searched according to the destination address of the IP header of the packet (226), and an internal header including the switch port number of the interface module designated in the routing table 25 as the destination of packet transfer is generated and added to the packet (211) to end this routine.

It can be understood that, in the packet communication node apparatus according to the invention, the packet transfer module 20 selectively transfers, according to the packet transfer processing routine 200, a received packet satisfying the conditions registered in advance as entries in the service module search table 26 (26A or 26B) to one of the service modules 30, and selectively transfers any other received packet to one of the other interface modules specified in the routing table 25.

Figure 16:
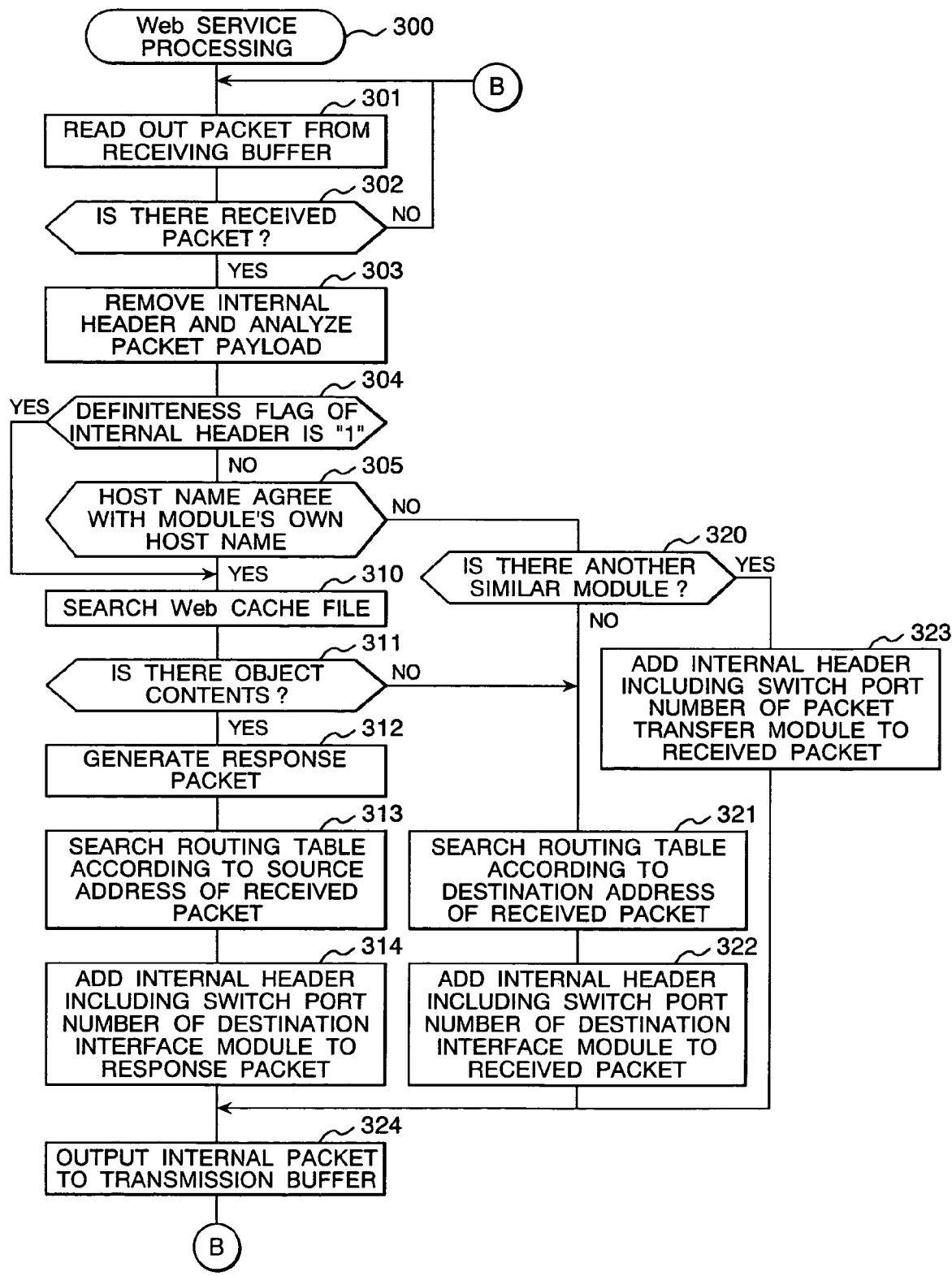
FIG. 16 shows an example of a Web service processing routine 300 to be executed by the Web service module.

FIG. 16 is a flow chart of a Web service processing routine 300 to be executed by the processors 33 of the Web service modules 30-1 and 30-2.

In the Web service processing routine 300, one of packets is read out of the receiving buffer 32 (step 301). If there is no packet in the receiving buffer (302), the program sequence returns to step 301 to repeat the same operation until a packet is received. When a packet is read out, the internal header is removed from the received packet after storing the value of the definiteness flag indicated by the internal header, the payload of the packet is analyzed to extract the file name 72 and the host name 73 from the HTTP message (request for contents acquisition) (303).

When the value of the definiteness flag is "1", the Web cache file 36W is searched with the file name 72 designated by the HTTP message as the search key (310). When the value of the definiteness flag is "0", it is checked whether the host name 73 designated in the HTTP message agrees with the module's own host name (305) and, if it does, the Web cache file 36W is searched (310).

As a result of the file search (311), if the Web contents corresponding to the designated file name 72 are found, an HTTP response message including the searched contents is generated, and further a response packet, whose payload portion includes the response message, destined for the source of the contents acquisition request is generated (312). After that, the routing table 35 is searched according to the source address of the IP header of the received packet to find the switch port number of the destination interface module corresponding to the source of the contents acquisition request (313), an internal header including the switch port number is added to the response packet (314), and the resultant packet is supplied to the transmission buffer 37 (324).

If no Web contents corresponding to the file name 72 are found in the Web cache file at step 311, the routing table 35 is searched according to the destination address of the received packet to find the switch port number of the destination interface module corresponding to the destination Web server of the packet (321). After that, an internal header including the switch port number is added to the received packet (322), the resultant packet is supplied as an internal packet to the transmission buffer 37 (324), and the program sequence returns to the first step 301.

If the designated host name 73 does not agree with the module's own host name at step 305, it is determined whether any other Web service module exists in the packet communication node apparatus resides the own module (320). The presence or absence of any other Web service module can be judged by, for instance, referring to configuration parameters (service module configuration information) made available in the data memory 39. If no other Web service module is found present in the packet communication node apparatus resides the own module, steps 321 through 324 are executed, and the program sequence returns to the first step 301.

If any other Web service module is found present in the packet communication node apparatus besides the own module, an internal header including the switch port number of the packet transfer module 20 known in advance and a definiteness flag "0" is generated and added to the received packet (323), and the resultant packet is supplied to the transmission buffer 37 (324).

In the packet communication node apparatus according to the invention, the Web service processing routine 300 enables a Web service module accommodated in the switching unit 40 to respond to a contents acquisition request in place of a Web server connected to the network. Also it can be understood that, even if the destination of the contents acquisition request packet transmitted by the interface module 10 is not appropriate, the request packet can be transferred from the Web service module to the packet transfer module 20, and that, even if the desired contents are not found in the cache file, the request packet can be transferred to an appropriate Web server on the network side.

Figure 17:
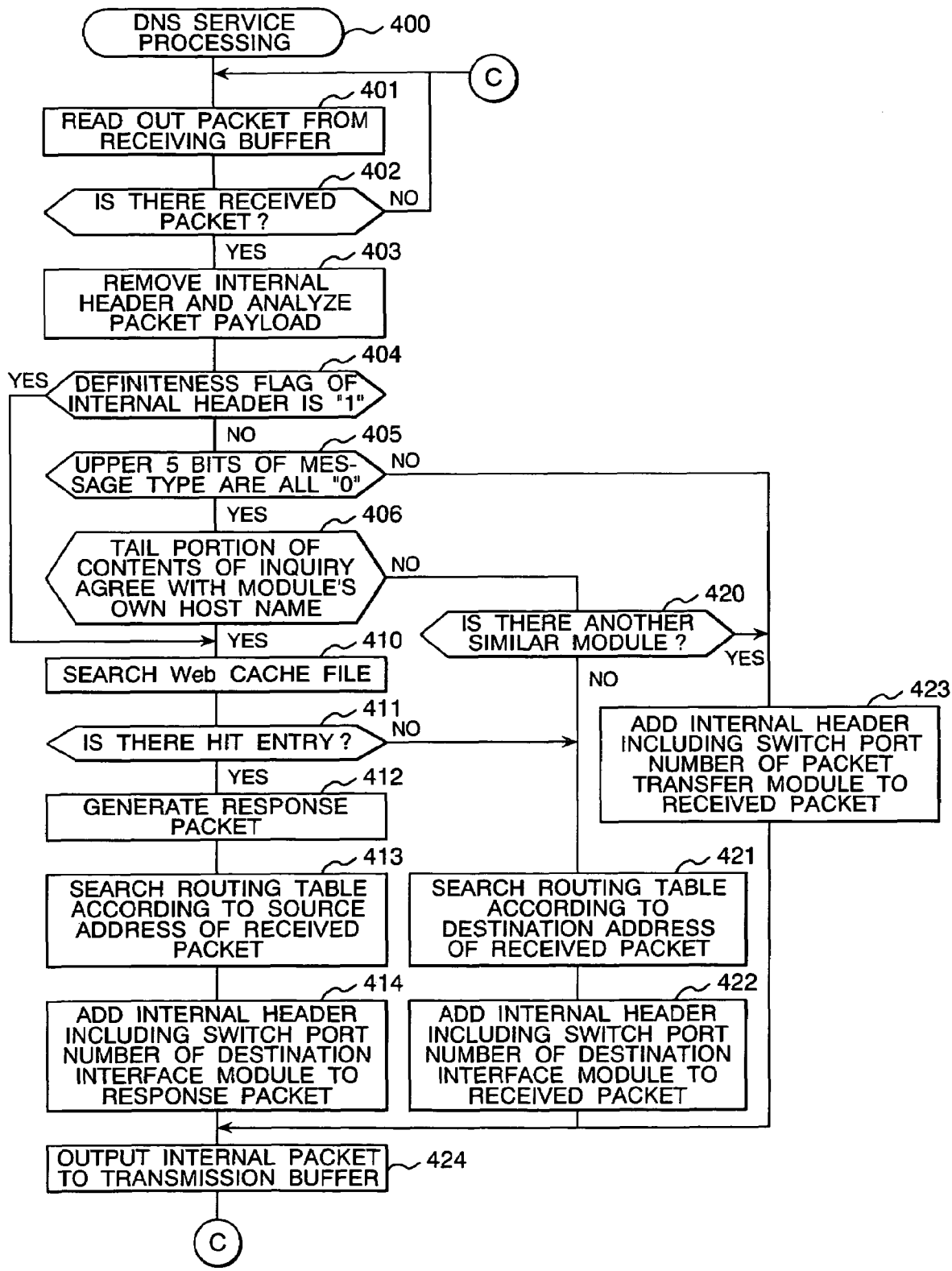
FIG. 17 shows an example of the DNS service processing routine 400 to be executed by the DNS service module.

FIG. 17 is a flow chart of a DNS service processing routine 400 to be executed by the processors 33 of the DNS service modules 30-3 and 30-4.

In the DNS service processing routine 400, one of packets is read out of the receiving buffer 32 (step 401) and, if there is no packet in the receiving buffer (402), the program sequence returns to step 401, followed by the repetition of the same operation until a packet is received. When a packet is read out, the internal header is removed from the received packet after storing the value of the definiteness flag indicated by the internal header, the payload of the packet is analyzed to extract the message type 812 in the header field of a DNSP message (address request), the contents of inquiry 821 (host name) in the inquiry field 82 and the class 823 (403).

When the value of the definiteness flag is "1", the DNS cache file 36D is searched with the contents of inquiry 821 and the class 823 designated by the DNS message as the search keys (410). When the value of the definiteness flag is "0", the upper five bits of the message type 812 are checked (405). If all the upper five bits are "0", it is judged whether the tail portion of the contents of inquiry is identical with the module's own domain name (406) and, if found identical, the DNS cache file 36D is searched with the contents of inquiry and the class designated by the DNS message as the search keys (410).

When any entry corresponding to the search keys is found in the DNS cache file (411), a DNS response message including the address 365 represented by the entry is generated, and a response packet destined for the source of address request whose payload portion includes the response message is generated (412). After that, as at steps 313 and 314 of FIG. 16, the routing table 35 is searched to find the switch port number of the destination interface module (413), an internal header including the switch port number is added to the response packet (414) and, after supplying the resultant packet to the transmission buffer 37 (424), the program sequence returns to step 401.

If no entry corresponding to the search keys is found in the DNS cache file at step 411, as at steps 321 and 322 of FIG. 16, the routing table 35 is searched to find the switch port number of the destination interface module matching the destination DNS server of the received packet (421), an internal header including the switch port number is added to the received packet (422) and, after supplying the resultant packet as an internal packet to the transmission buffer 37 (424), the program sequence returns to the first step 301.

If the tail portion of the contents of inquiry is not identical with the module's own domain name at step 406, configuration parameters made available in the data memory 39, for instance, are referred to in order to judge whether any other DNS service module exists in the packet communication node apparatus besides the own module (420). When no other DNS service module exists, steps 421 through 424 are executed, and the program sequence returns to the first step 401. When any other DNS service module exists in the packet communication node apparatus besides the own module, an internal header including the switch port number of the packet transfer module 20 known in advance and a definiteness flag "0" is generated and added to the received packet (423). The resultant packet is supplied to the transmission buffer 37 (424).

In the packet communication node apparatus according to the invention, the DNS service processing routine 300 enables a DNS service module accommodated in the switching unit 40 to respond to an address acquisition request in place of a DNS server connected to the network. Also it can be understood that, even if the destination of the contents acquisition request packet transferred by the interface module 10 is not appropriate, the request packet can be transferred to the packet transfer module 20, and that even if the desired data are not found in the cache file, the request packet can be transferred to an appropriate DNS server on the network side.

As is evident from the foregoing description of the embodiment, according to the present invention, since the packet communication node apparatus is provided, as one of the modules, with the packet transfer module 20 for determining the transfer destination module of received packet based on the result of payload analysis of the received packet, even if there exist a plurality of service modules having the same or similar service application functions as the extension modules of the packet communication node apparatus, each of the interface modules can distribute a received packet to an appropriate service module with high precision by transferring the received packet to be processed by one of the service modules to the packet transfer module 20. Therefore, rapid service processing with the loads being distributed among the plurality of service modules is made possible within the packet communication node apparatus.

Although the embodiment described above is supposed to have a plurality of Web service modules and a plurality of DNS service modules, the node apparatus may include only one DNS (or Web) service module. In this case, the DNS service module may be specified as a destination of a received packet by the extension module field (switch port number) 164 of a DNS entry in the extension module search table 16 provided for each interface module 10.

In this case, the DNS service module executes DNS service when it can respond to a received packet by itself. If the received packet is judged not appropriate to respond, the DNS service module may transfer the received packet to an appropriate DNS server on the network side indicated by the destination address of the received packet because of the absence of any other DNS server in the packet communication node apparatus. By updating the contents of the extension module search table 16 according to the configuration of a group of extension modules in this way, it is made possible to provide flexible service, and to reduce the load of the packet transfer module 20 and the load of packet switching within the packet communication node apparatus.

Although the function of the packet transfer module 20 in this embodiment is limited solely to transferring packets received from each interface module to a service module or an interface module, it is also possible to provide the packet transfer module 20 with a specific service function. For instance, referring to the flow chart of FIG. 14, when the received packet was judged as a Web contents acquisition request (step 206), the processor 23 may refer to a filtering table prepared to check whether the request is of contents acquisition from a specific Web site which is prohibited to access in advance, thereby to discard the request packet.

Further, in the foregoing description of the embodiment, the value of a destination port number of received packet is supposed to be successively judged in the packet transfer processing routine 200 to identify the transfer destination module (Web service module, DNS service module or interface module) of the received packet for the sake of brevity of description. However, in order to permit scalable addition of extension modules, for instance, a determination routine management table may be prepared to register a plurality of entries each indicating the relation between the value of the destination port number and a transfer destination determination routine, and in the packet transfer processing routine the management table is searched for an entry corresponding to the destination port number of a received packet. When any corresponding entry is found in the table, the transfer destination of the received packet can be specified according to a determination routine designated by that entry. If no entry corresponding to the destination port number is found in that table, an interface module corresponding to the destination address of the received packet may be specified according to the routing table.

Although the description of the embodiment was made by referring to a packet communication node apparatus provided with one interface module for each pair of network input/output lines, the invention is as well applicable to a packet communication node apparatus of a configuration in which each interface module accommodates a plurality of pairs of network input/output lines and packets received from each of the plurality of input/output lines are successively stored in a receiving buffer for routing.

What is claimed is:

1. A packet communication node apparatus comprising:
a plurality of interface modules each connected to network input/output lines,
a plurality of service modules each for executing predetermined communication service processing in response to a received packet,
a packet transfer module for transferring a received packet from any one of said service modules and said interface modules and to another one of said service modules and said interface modules, and
a switching unit for mutually connecting said interface modules, said service modules and said packet transfer module to exchange packets among the modules,
wherein each of said interface modules is provided with routing means for selectively transferring via said switching unit a packet received from the network input line to one module selected from among said packet transfer module, service modules, and one of the other interface modules corresponding to a destination address of the received packet.

2. The packet communication node apparatus according to claim 1, wherein the packet transfer module transfers a received packet either from one of said service modules and to one of said interface modules, or from one of said interface modules and to one of said service modules.

3. A packet communication node apparatus comprising:
a plurality of interface modules each connected to network input/output lines, a plurality of service modules each for executing predetermined communication service processing in response to a received packet,
a packet transfer module for transferring a received packet to one of said service modules or one of said interface modules, and
a switching unit for mutually connecting said plurality of modules to exchange packets among the modules,
wherein each of said interface modules is provided with routing means for selectively transferring via said switching unit a packet received from the network input line to one module selected from among said packet transfer module, service modules, and one of the other interface modules corresponding to a destination address of the received packet, and
wherein each of said service modules is provided with routing means for checking a payload of a packet received from said switching unit, and selectively transferring the received packet to said packet transfer module or one of said interface modules corresponding to the destination address when the packet was judged impossible to be handled by the service module.

4. The packet communication node apparatus according to claim 3, wherein the routing means of each of said service modules selectively transfers the received packet to one of said interface modules corresponding to the destination address when the received packet was judged impossible to be handled by the service module and it was judged that no other service module to execute an application similar to the service module is connected to said switching unit.

5. A packet communication node apparatus comprising:
a plurality of interface modules each connected to network input/output lines, a plurality of service modules each for executing predetermined communication service processing in response to a received packet,
a packet transfer module for transferring a received packet to one of said service modules or one of said interface modules, and
a switching unit for mutually connecting said plurality of modules to exchange packets among the modules,
wherein each of said interface modules is provided with routing means for selectively transferring via said switching unit a packet received from the network input line to one module selected from among said packet transfer module, service modules, and one of the other interface modules corresponding to a destination address of the received packet,
wherein each of said interface modules has an extension module search table comprising a plurality of entries each defining a packet transfer destination module corresponding to a combination of specific header items of a received packet and a routing table comprising a plurality of entries each defining a packet transfer destination module corresponding a destination address of a received packet, and
wherein the routing means of each of said interface modules identifies the packet transfer module or service module for which the received packet is destined on the basis of header information of the packet received from the network input line and said extension module search table and, when the header information of the received packet does not agree with any of the combinations of header items defined in said extension module search table, identifies the interface module for which the received packet is destined in accordance with said routing table.

6. The packet communication node apparatus according to claim 5, wherein the routing means of each of said interface modules acquires from one of said extension module search table and routing table an identifier indicating the packet transfer destination module to which the received packet is to be transferred, adds to the received packet an internal header including the identifier of the packet transfer destination module and supplies it as an internal packet to said switching unit, said packet transfer module supplies to said switching unit a packet received from the switching unit as an internal packet with an internal header including a new module identifier representing one of said service modules or one of said interface modules, each of said service modules supplies to said switching unit a packet received from the switching unit or a response packet generated as a result of execution of communication service processing as an internal packet with an internal header including a module identifier of a new packet transfer destination module, and said switching unit exchanges each of internal packets received from said interface modules, said packet transfer module and said service modules in accordance with a module identifier represented by the internal header.

7. The packet communication node apparatus according to claim 5, wherein the routing means of each of said interface modules acquires from each of said extension modules search table and routing table an identifier indicating a packet transfer destination module to which the received packet is to be transferred, adds to the received packet an internal header including the identifier of said destination module, and supplies it as an internal packet to said switching unit, said packet transfer module supplies to said switching unit a packet received from the switching unit as an internal packet with an internal header including a new module identifier representing one of said service modules or one of said interface modules, each of said service modules supplies to said switching unit a packet received from said switching unit or a response packet resulting from the execution of communication service processing as an internal packet with an internal header including a module identifier of a new packet transfer destination module, and each of said interface modules selectively receives output packets from said switching unit in accordance with the module identifier indicated by the internal header and transmits each received packet to the network output line after removing the internal header therefrom.

8. The packet communication node apparatus according to claim 5, wherein said packet transfer module has a service module search table comprising a plurality of table entries each defining a packet transfer destination module corresponding to a combination of a specific header item and payload information of a received packet and a routing table comprising a plurality of table entries each defining a packet transfer destination module corresponding to the destination address of a received packet, the packet transfer destination service module for the received packet is identified on the basis of said service module search table and, if the header item and payload information of the received packet do not agree with none of the definition in said service modules search table, an interface module corresponding to the destination address of the received packet is identified in accordance with said routing table.

* * * * *